United States Patent Office 3,526,679
Patented Sept. 1, 1970

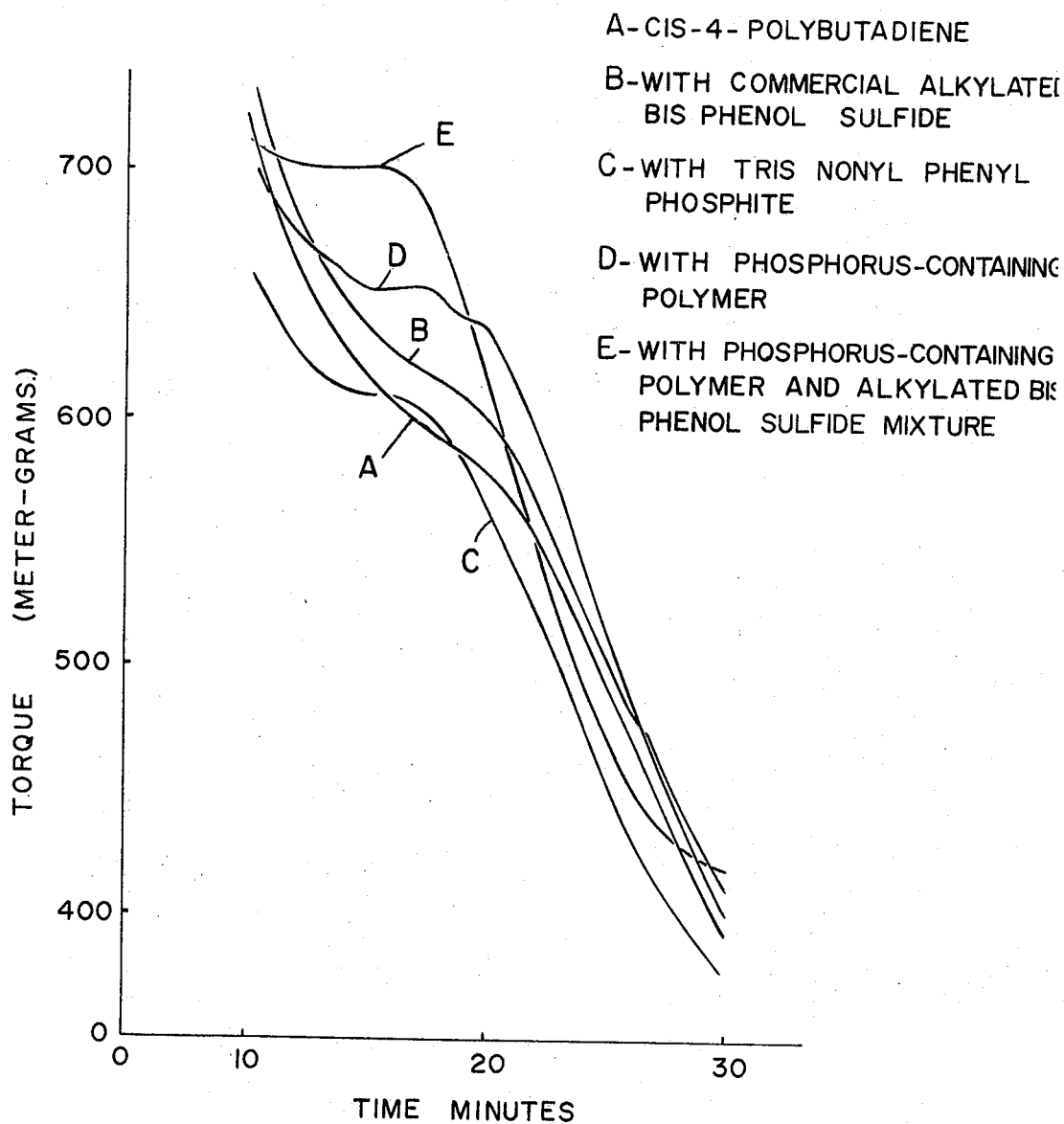

3,526,679
POLYMERS STABILIZED WITH ORGANIC SULFIDES AND PHOSPHITES
Richard Strauss, Lexington, and James Bottomley, Tewksbury, Mass., assignors to National Polychemicals, Inc., Wilmington, Mass., a corporation of Massachusetts
Continuation-in-part of applications Ser. No. 443,174, Mar. 26, 1965, and Ser. No. 462,385, June 8, 1965. This application Mar. 28, 1966, Ser. No. 538,022
Int. Cl. C08f 29/12
U.S. Cl. 260—887                       10 Claims

ABSTRACT OF THE DISCLOSURE

An organic polymer subject to degradation, e.g., a $C_2$-$C_4$ olefin resin, is stabilized by a composition composed of: (a) an alkylated phenol polysulfide, and (b) a phosphorus containing polymer prepared by the reaction of a phenol, an aldehyde capable of condensing with the phenol and a trivalent phosphorus compound.

This application is a continuation-in-part of our copending applications, Ser. No. 443,174 filed Mar. 26, 1965 now Pat. No. 3,435,097 and Ser. No. 462,385 filed June 8, 1965 now Pat. No. 3,367,996.

Our invention relates to unique and novel mixtures of phosphorus-containing polymers and polysulfide compounds for use in stabilizing organic polymers such as polyolefin resins and natural and synthetic elastomers and to the polymers so stabilized.

Our copending application, Ser. No. 462,385 describes a new and unique class of phosphorus-containing polymers identified as ester polymers and phosphite polymers. These polymers are prepared by the reaction of a phenol, an aldehyde capable of condensing with the phenol and a trivalent phosphorus compound. These compounds are useful as additives in the stabilization of various polymers. Our copending application Ser. No. 443,174 describes phosphorus-containing polymers prepared with the use of a phenolic sulfide. The phenolic sulfide phosphite polymers are useful as stabilizers and antioxidants in polymers. However, it has been found that these phenolic sulfide phosphite compounds often have a tendency to develop sulfide odor in use. The inhibition or prevention of such sulfide odor may require the addition of other additives or more sophisticated processing techniques.

It is, therefore, an object of our invention to provide mixtures for use in stabilizing polymers subject to degradation by heat or oxygen which mixtures avoid the development of sulfide odors associated with the use of phenolic sulfide phosphite polymers and which provide excellent and enhanced stabilizing properties.

Another object of our invention is to provide natural and synthetic elastomers and polyolefin resins stabilized with mixtures of a phosphorus-containing polymer and an alkylated bis sulfide.

Other objects and advantages of our invention will be apparent to those persons skilled in the art from the following more detailed description of our invention when taken in conjunction with the accompanying drawing wherein there is shown in graphical form the stabilization of cis-4-polybutadiene elastomer by various additives.

Briefly, our invention comprises a unique mixture of a phosphorus-containing polymer and an alkylated phenol polysulfide as a stabilizing and/or antioxidant mixture for polymers, in particular polyolefins and polydiene elastomers. We have found that the preparation of a simple mixture or blend of these ingredients avoids the strong sulfide odor associated with polymers prepared by the reaction of an alkylated phenol polysulfide and formaldehyde. In addition our mixture provides enhanced and surprising stabilizing and antioxidant properties. These stabilizing mixtures may vary in either component from about 5 to 95 percent by weight although mixtures of from about 40 to 60 percent by weight typically give optimum results in most common polymers. In general, an increase in the alkylated sulfide compound above about 60 percent may tend to develop a gradually increasing yellow color when the mixture is used in white or light colored polyolefin resins. An increase in the phosphorus-containing polymer above about 60 percent may tend to reduce the antioxidant effectiveness of our mixture. Our mixtures may be even further enhanced in stabilizing properties in polymers by the addition of small amounts of from about 5 to 50 percent by weight of a borate compound such as a hydrocarbon-substituted borate.

The phosphorus-containing polymers employed with our mixture may comprise those ester and phosphite polymers described in our copending application. The phosphite polymers, prepared by the reaction of a tris alkyl phenol phosphite reacted with formaldehyde in the presence of an acid catalyst to yield a fusible, soluble ester polymer, are preferred for use in natural and synthetic elastomers due to their high resistance to hydrolysis. Thermoplastic, fusible, soluble phosphorus-containing polymers prepared with the use of substituted phenols like alkylated $C_4$-$C_{18}$ phenols such as, for example $C_4$-$C_9$ phenols having para alkyl groups and reacted with less than a stoichiometric amount of formaldehyde are the preferred phosphorus-containing polymers for use in our mixtures.

The phenol polysulfides employed in combination with our phosphorus-containing polymers include phenolsulfide, as well as phenolic disulfide polymers. Typical phenolic substituted and unsubstituted polysulfides may be prepared by the general reaction of an alkylated phenol with a sulfur-containing compound such as sulfur monochloride, sulfur dichloride, free sulfur and the like. For example, phenol polysulfides are prepared by the reaction of 1 mol of a phenolic compound with from 1 to 2 mols or more of a sulfur monochloride at temperatures of from about 80 to 350° F. with the removal of hydrochloric acid as the sulfurization reaction proceeds. Typical phenol polysulfide compounds include bis-(nonyl phenol) disulfide, bis-(phenol) disulfide, di-(para nonyl phenol) disulfide, di-(octyl phenol) disulfide, di-(para tertiary butyl phenol) disulfide, poly(2,6 di-tertiary-4-methyl phenol) sulfide, and the like. A general reaction for the preparation of the poly sulfides is as follows:

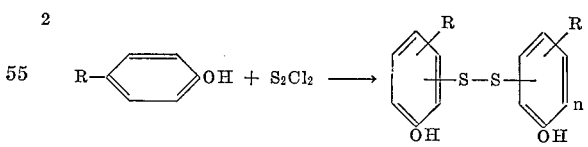

R=one or more hydrocarbon groups such as alkyl groups
$n$=is a number of from one to five.

Our mixtures may include the addition of small amounts of a borate such as a hydrocarbon-substituted borate or other borates which have a reduced tendency to hydrolyze. Tris-hydrocarbon-substituted borates and in particular alkyl, phenyl and alkylated phenyl substituted borates and mixed borates such as 2,6-tertiary-butyl-para-cresyl-di-butyl borate may be used. Mixtures having a sulphur to phosphite ratio of about two to one to one to two and mixtures having a sulfide to borate ratio about three to one are effective as stabilizers.

Our mixtures may be employed in a wide variety of natural and synthetic polymeric materials which are subject to degradation upon exposure to heat or oxygen either during processing or in use. Our mixtures, therefore, may often serve as polyfunctional additives exhibiting both heat stabilizing and antioxidant properties. Typical polymers in which our mixtures may be employed include but are not limited to those natural and synthetic elastomers such as the rubbery diene vulcanizates like polybutadiene, polyisoprene, copolymers of styrene and a diene such as styrene and butadiene and terpolymers thereof, ethylene-propylene copolymers and diene modified terpolymers, butyl rubber, natural rubber, nitrile rubbers like styrene and acrylonitrile copolymers and butadiene and acrylonitrile copolymers and the like. Our mixtures are particularly preferred for use in those sulfur and zinc oxide curable elastomers having a moderate to high degree of carbon-to-carbon ethylenic unsaturation. Our mixtures may be incorporated in the rubber latex, solvent solutions of the rubber, or directly added or dispersed in the bulk rubber either after, before or during processing or the polymerization reaction but generally prior to vulcanization.

Our mixtures may also be employed in other polymers such as acrylic resins, polyesters, styrene resins, such as polystyrene, styrene-butadiene-acrylonitrile resins, vinyl halide resins such as polyvinyl chloride, copolymers of vinyl acetate and vinyl chloride and the like, as well as in $C_2$–$C_4$ polyolefin resins, such as straight and branch chain, crystalline and non-crystalline, low and high density type polyethylene, polypropylene, polybutene, ethylene-butene copolymers, ethylene-propylene copolymers and other olefinic resins.

Our mixtures are commonly employed in the polymer in amounts ranging from about 0.001 to 5.0 percent by weight such as in amount of from 0.1 to 3.0 percent by weight in elastomers and 0.05 to 0.5 weight percent in thermoplastic resins. Our mixtures are particularly useful in replacing in whole or in part expensive hindered phenols or antioxidants such as 2,2′ alkylene bis 4,6 dialkyl phenols like 2,2′-methylene bis (4,6-ditertiary butyl phenol) presently used as antioxidants. However, our mixtures may be used alone or in conjunction with other additives such as hindered phenols like butyrated hydroxy toluene, thiodipropronic acid esters such as fatty esters like dilauryl thiodipropronic acid, stabilizers, plasticizers, carbon black, fillers, curing agents, accelerators, dyes, pigments, and the like.

The enhanced stabilization properties of our mixtures is demonstrated by tests employing a Brabender Plasti-Corder employing a polymer and then the same polymer with various additives incorporated therein. The Plasti-Corder records the torque in meter-grams of the polymer versus the time in minutes of the polymer sample in the instrument. The resulting curve of torque versus time provides an indication of the relative stability of the polymer against degradation. The earlier first portion of the curve represents the fluxing stage wherein the polymer used is changed into a homogeneous polymer melt. Thereafter the shape and height of the curve depends upon each polymer's average molecular weight, the molecular weight distribution, apparent viscosity, stability and the conditions of temperature and shear set into the instrument. Typically the curve drops rapidly at the end of the fluxing state to a point of reasonably stable flow. The length of the plateau in the final torque readings of each polymer are indications as to the stability of the polymer. The time length of the plateau indicates how long the polymer retains the condition of stable flow, and is a function of how well the polymer is stabilized against degradation.

EXAMPLE 1

The drawing illustrates the graphical results obtained with cis-4-polybutadiene (American Synthetic Rubber Company—Cisdene 100LM). The instrument was operated with a cam-like head, a stock thermocouple temperature of 400° F., a charge of 50 grams, a shear rate of 60 r.p.m., and with each additive employed in an amount of 0.25 part per 100 parts of the polybutadiene as purchased. Curve B represents the polybutadiene containing a commercial alkylated bis-phenol sulfide identified as Antioxidant 439 by the Naugatuck Division of the United States Rubber Company. Curve C represents the polybutadiene containing tris-nonyl phenol phosphite, a conventional phosphite additive commonly employed as a stabilizer in rubber. Curve D represents polybutadiene with a phosphorus-containing polymer. The phosphorus-containing polymer is an ester polymer prepared by the reaction of a tris-nonyl-phenol phosphite with formaldehyde in the presence of an acid catalyst to provide a thermoplastic soluble, yellow liquid prepared in the manner of Example 1 of Ser. No. 462,385. Curve E represented polybutadiene containing the phosphorus-containing polymer of Curve D and a di-(nonyl phenol) disulfide. The di-(nonyl phenol) disulfide was prepared by the reaction of nonyl phenol with a sulfur mono-chloride in an approximate 1–0.5 mol ratio. The mixture of Curve E was prepared in an amount of about 50–50 percent by weight.

By examination of the curves of the drawing, the unstabilized cis-4-polybutadiene exhibited a lack of stability as evidenced by the rapid and smooth continuous drop of the torque reading with time without any evidence of a stabilizing plateau. Conventional stabilizer and antioxidant additives, as shown in Curves B and C respectively, also fail to exhibit any significant stabilizing plateaus. Curve D representing the phosphorus-containing polymer shows a plateau at a torque reading of about 650 meter-grams; however, the length of the time length of the torque plateau is rather short. This curve illustrates that the phosphorus-containing polymer exhibited some stabilizing effect on the polybutadiene. Curve E representing the mixture of our invention shows a flat plateau at a high torque level of 700 meter-grams for the polybutadiene. The character of the curve and the length of the plateau and the high torque reading illustrate the enhanced effectiveness of employing a mixture of an alkylated phenol disulfide with a phosphorus-containing polymer. No sulfide odor was observed in the polymer with our mixture as shown in Curve E. The overall stabilizing properties of our mixture in combination is often better than either component employed alone.

EXAMPLE 2

The addition of about 5 percent of a 2,6 tertiary butyl para cresol di-alkyl borate to the mixture of Example 1 has been found to further enhance the stabilizing effectiveness of our mixture by extending the length of the torque-time plateau. The unique and unexpected properties of our mixture in comparison with other well-known commercial stabilizers and antioxidants, as well as in comparison with either component or the mixture alone, is thus demonstrated.

EXAMPLE 3

Similar testing of the above mixtures in polyolefin resins has demonstrated an enhanced stabilizer effectiveness of our mixture. For example, similar testing employing a light colored ethylene-butene copolymer having a melting index of 22, a density of 0.948 (PE5130, E. I. du Pont Company) has been carried out. The instrument was operated having a roller 6 type head, a temperature of 200° C., a shear rate of 125 r.p.m., a charge of 35 grams and with the additives employed in an amount of 250 parts per million. Comparative tests were conducted between the ethylene-butene copolymer alone and the copolymer containing a commercial hindered phenol known as Ionox 330 as an antioxidant, and with our mixture as shown in Curve E above. It was found that our mixture was clearly superior to the expensive commercial antioxidant at the same additive level in protecting the copolymer from degradation. Our mixture is particularly valuable for use in pigmented or colored polyolefin resins, wherein any tendency of the mixture to slightly yellow or discolor the resin may be unobserved.

EXAMPLE 4

In another heat-aging test a polypropylene resin (Hercules Company Profax 6501) was tested with our mixture as shown in Curve E of Example 1 in combination with an equal additive amount of butylated hydroxy toluene. The resin so stabilized was superior to a 50-50 additive mixture of the butylated hydroxy toluene in combination with a dilauryl thiodiproponic acid ester. The latter mixture imparted a yellow color to the polypropylene on standing, while the resin with our mixture remained light over the same period of time.

Our mixtures are, therefore, useful stabilizers and antioxidant mixtures, and are often superior in performance or less expensive than many commercial antioxidants or stabilizing additives presently employed, while in addition our mixtures avoid the odor problem of the related reaction products. Our mixtures may also be used as additives in oils, waxes, jet fuels, gasoline, heating oil, lubricants, and other petroleum or chemical solids or liquids wherein a stabilizing additive is desired.

What we claim is:

1. An organic polymer subject to degradation which polymer is stabilized by the addition of a small amount of from about 0.001 to 5.0 percent by weight of a stabilizing mixture comprising:

(a) an alkylated phenol polysulfide of the formula:

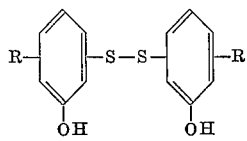

wherein R is an alkyl group and (b) a phosphorus-containing polymer selected from the group consisting of polymers prepared by the reaction of an aryl phosphite unsubstituted in the 2,4, or 6 position and an aldehydic compound capable of condensing with the aryl phosphite which aldehydic compound is selected from the group consisting of aliphatic and alicyclic aldehydes, the mol ratio being between about 0.1 and 2.0; the polysulfide and phosphorus-containing polymer each present in an amount ranging from about 5 to 95 percent by weight of the mixture.

2. The composition of claim 1 wherein the polymer is a $C_2$–$C_4$ olefin resin.

3. The polymer of claim 1 wherein the polymer is a diene vulcanizate.

4. The composition of claim 1 wherein the bis-phenol polysulfide is a $C_4$–$C_9$ phenol disulfide.

5. The composition of claim 1 wherein the phosphorus-containing polymer is a fusible, soluble phosphite polymer prepared by the reaction of a $C_4$–$C_{18}$ alkyl phenol phosphite reacted with less than a stoichiometric amount of formaldehyde.

6. The composition of claim 1 wherein the stabilizing mixture includes from about 5 to about 50 percent by weight of a hydrocarbon-substituted borate.

7. The composition of claim 1 wherein the polymer is polybutadiene, the sulfide is a bis-(nonyl phenol) disulfide, and the phosphorus-containing polymer is a trisnonyl phenol phosphite-formaldehyde reaction product.

8. The composition of claim 1 wherein the polymer is a polyolefin resin which contains a small amount of a hindered phenol.

9. The composition of claim 1 wherein the polysulfide and phosphorus-containing polymer each are present in an amount of from about 40 to 60 percent by weight.

10. The composition of claim 1 wherein the phosphorus-containing polymer is a fusible, soluble phosphite ester prepared by the reaction of nonyl phenol phosphite with formaldehyde, the polysulfide is a nonyl phenol disulfide, and the polymer is a $C_2$–$C_4$ polyolefin resin.

References Cited

UNITED STATES PATENTS

| | | | |
|---|---|---|---|
| 3,367,996 | 2/1968 | Strauss et al. | 260—887 |
| 3,365,406 | 1/1968 | Kopacki et al. | 260—23 |
| 3,297,631 | 1/1967 | Bown et al. | 260—45.95 |
| 3,131,164 | 4/1964 | Doyle et al. | 260—48.5 |
| 2,175,082 | 10/1939 | Hagen et al. | 260—94 |

MURRAY TILLMAN, Primary Examiner

C. J. SECCURO, Assistant Examiner

U.S. Cl. X.R.

260—4, 45.7, 45.95, 844, 845, 846, 847, 848, 897, 898, 899, 901